United States Patent
Sartor et al.

(10) Patent No.: US 7,239,756 B2
(45) Date of Patent: Jul. 3, 2007

(54) METHOD FOR ENHANCING THE QUALITY OF AN IMAGE

(75) Inventors: Piergiorgo Sartor, Fellbach (DE); Peter Wagner, Waiblingen (DE)

(73) Assignee: Sony Deutschland GmbH, Cologne (DE)

( * ) Notice: Subject to any disclaimer, the term of this patent is extended or adjusted under 35 U.S.C. 154(b) by 711 days.

(21) Appl. No.: 10/283,728

(22) Filed: Oct. 30, 2002

(65) Prior Publication Data
US 2003/0081856 A1    May 1, 2003

(30) Foreign Application Priority Data
Oct. 31, 2001  (EP)  .................... 01126028

(51) Int. Cl.
*G06K 9/40*    (2006.01)
(52) U.S. Cl. ............................ 382/274
(58) Field of Classification Search ............ 382/274
See application file for complete search history.

(56) References Cited

U.S. PATENT DOCUMENTS

| | | | |
|---|---|---|---|
| 5,150,421 A * | 9/1992 | Morishita et al. ........... 382/169 |
| 5,357,549 A * | 10/1994 | Maack et al. ................. 378/62 |
| 5,388,168 A | 2/1995 | Sakashita et al. |
| 5,450,502 A | 9/1995 | Eschbach et al. |
| 5,550,888 A * | 8/1996 | Neitzel et al. ............. 378/98.7 |
| 5,835,618 A * | 11/1998 | Fang et al. ................. 382/132 |
| 5,946,407 A * | 8/1999 | Bamberger et al. ......... 382/132 |
| 5,995,656 A * | 11/1999 | Kim ........................... 382/169 |
| 6,075,890 A * | 6/2000 | Park ........................... 382/169 |
| 6,097,849 A | 8/2000 | Nevis |
| 6,219,447 B1 * | 4/2001 | Lee ............................ 382/168 |
| 6,393,148 B1 * | 5/2002 | Bhaskar ..................... 382/169 |
| 6,650,774 B1 * | 11/2003 | Szeliski ..................... 382/169 |

FOREIGN PATENT DOCUMENTS

| | | |
|---|---|---|
| EP | 0 809 209 | 11/1997 |
| FR | 2 803 070 | 6/2001 |

OTHER PUBLICATIONS

Rafael Gonzalez, Paul Wintz, Section 4.2.2 Histogram Equalization, Digital Image Processing, Addison-Wesley Publishing Company, 1977.*

* cited by examiner

*Primary Examiner*—Wenpeng Chen
*Assistant Examiner*—Yuzhen Ge
(74) *Attorney, Agent, or Firm*—Oblon, Spivak, McClelland, Maier & Neustadt, P.C.

(57) ABSTRACT

A method for enhancing the quality of an image, in particular with respect to its contrast properties, comprises the step of calculating a histogram for an input image (S5), equalizing the input image on the basis of the calculated histogram to obtain a corresponding histogram equalized image (S5), wherein the histogram equalized image and the input image are merged/mixed/blended (S6) to obtain an output image, wherein merging/mixing/blending is weighted (S12) in dependency of the content of the input image and/or of other input image data relating to the input image. This makes it possible to further improve the quality of histogram equalized images.

16 Claims, 4 Drawing Sheets

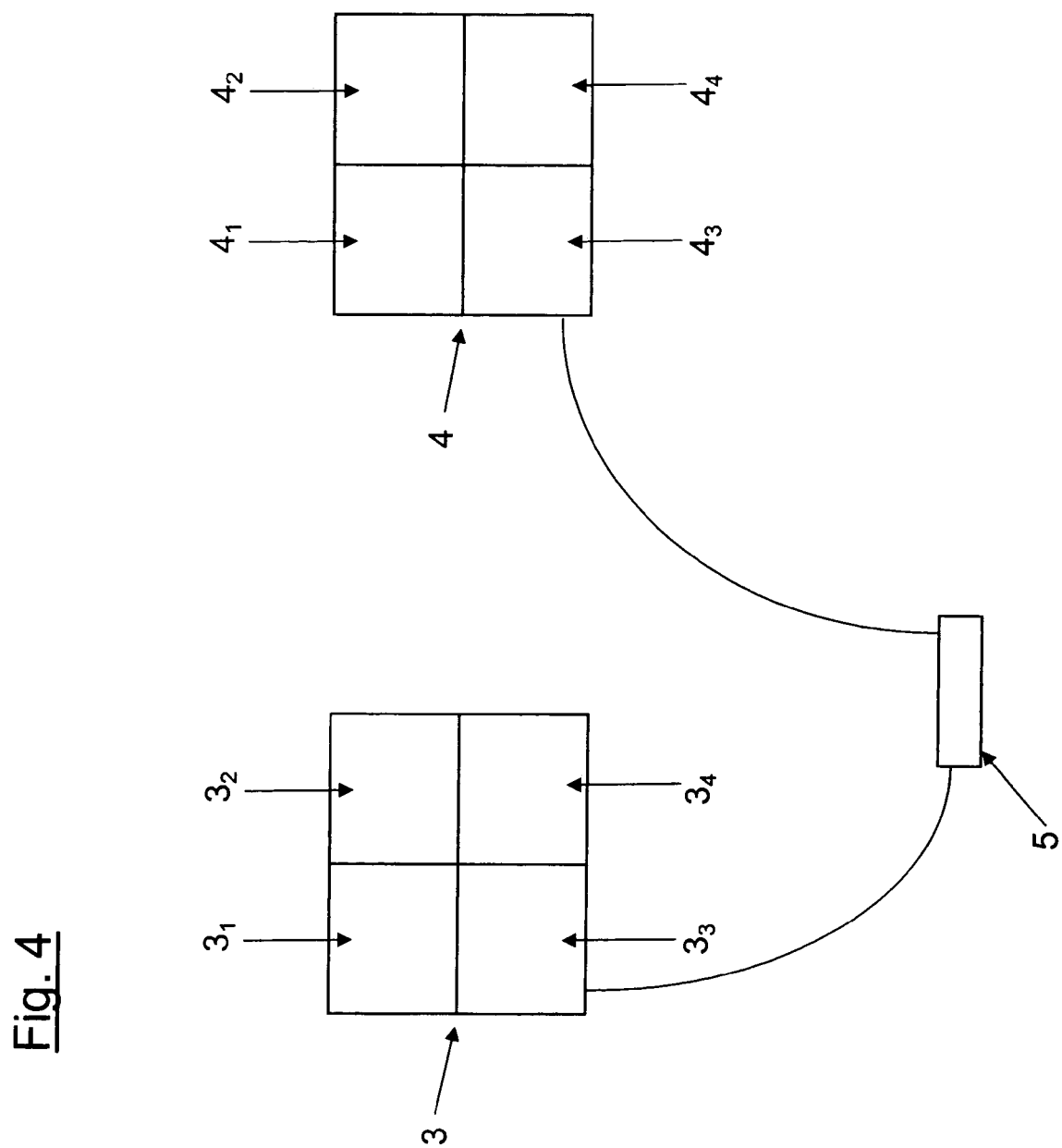

METHOD FOR ENHANCING THE QUALITY OF AN IMAGE

The invention relates to a method for enhancing the quality of an image, in particular with respect to its contrast properties.

BACKGROUND OF THE INVENTION

Among the many methods for enhancing the quality of an image, a very widely known one is histogram equalization. Using this technique, it is possible to enhance the contrast of a given image according to the occurences of different intensity levels contained within the image. It is also common to use this technique with respect to other image parameters like the brightness. In addition, histogram equalization may serve as a basis for image data reduction.

U.S. Pat. No. 5,388,168 discloses for example a picture quality improving circuit for enhancing the quality of an input signal. First, a cumulative histogram is derived from the input signal. Then, according to the level of the input signal, specific histogram values are selected based on which the input signal gets interpolated, thereby obtaining a corrected output signal.

Another example of a histogram equalization method is disclosed by U.S. Pat. No. 5,450,502. An input image is divided into a number of segments, for each of which a local histogram signal is generated. The local histogram signals are compared to a global histogram signal to obtain a comparison result. The comparison result is then used to further process the image, in particular to calculate a tone-reproduction curve which is used to correct the input image.

BRIEF SUMMARY OF THE INVENTION

It is an object of the present invention to provide a method for enhancing the quality of an image, in particular with respect to its contrast properties which shows improved enhancement results, while at the same time avoiding artifacts typical of this technique.

To solve this object, the present invention provides a method for enhancing the quality of an image according to claim 1. Preferred embodiments of this method are described in the subclaims 2 to 11. Further, the present invention provides an apparatus for enhancing the quality of an image according to claim 12. Finally, the present invention provides a computer program product according to claim 13.

According to the present invention, the method for enhancing the quality of an image comprises the steps of:
a) calculating a histogram for an input image,
b) equalizing the input image on the basis of the calculated histogram to obtain a corresponding histogram equalized image, and is characterized by the step of
c) merging the histogram equalized image and the input image to obtain an output image, wherein the merging is weighted in dependency of the content of the input image and/or of other input image data relating to the input image.

A central aspect of the present invention is that the histogram equalized image is not taken as the final output image, but is further merged/mixed/blended (in the following only referred to as merging) with the "original" image (the input image). This additional step allows to further improve the quality of the final output image and to suppress artifacts which are typically present in a histogram equalized image.

The input image data may consist of only one input image. However, the input image data preferably comprises additional input images, e.g. following or preceding images of an input image stream, and/or other data like controlling information correlated to the input image.

Preferably, step c) described above comprises the steps of:
d) analyzing the content of the input image and/or the other input image data,
e) calculating respective statistical properties and/or derivatives thereof on the basis of the analyzed image data content, and
f) processing the calculated statistical properties and/or the derivatives, wherein the merging is performed in dependency of a result of the processed calculated statistical properties and/or the derivatives.

Statistical properties may for example be intensity statistics, brightness statistics, colour statistics or the like. Accordingly, corresponding derivatives may for example be colour gradients or intensity gradients within the input image or between the input image and images belonging to the other input image data and being different from the input image.

Three different parts of the input image data may be taken into account before finally obtaining the output image: A first part of the input image data is the input image itself. A second part of the input image data may be used to calculate the histogram for the input image. This is preferably the content of the input image itself and therefore equal to the first part of the input image data. However, it is also possible to derive the histogram from other images, if such are contained within the other input image data. That is, steps a) and b) could be performed in dependency of the content of the input image and/or of other images relating to the input image. A third part of the input image data may be used to weight the merging of the histogram equalized image and the input image, i.e. steps d) to f) could be performed on the basis of the third part of the input image data. Preferably, however, the first, the second, and the third part of the input image data are identical, i.e. the input image itself.

To further improve the quality of the output image, the input image and/or other images contained within the input image data are divided into at least two image parts, respectively, before statistical properties and/or derivatives are calculated for each image part. This enables a high "statistical resolution" which may serve as a basis for further improving the quality of the output image.

The process of dividing the input image into the image parts may be based on an image part detection process. That is, the shape/size of the respective image parts are determined by an image part detection process.

The calculated statistical properties and/or derivatives of different image parts may for example be compared with each other. If the statistical properties and derivatives of different image parts are similar, the corresponding image parts may be merged together to obtain respective merged image regions. Then, statistical properties and/or derivatives thereof are again calculated for each merged image region. Step f) may then be executed on the basis of the recalculated statistics and derivatives of the merged image regions. Thus, it is possible to identify areas with common properties in order to improve the overall quality of the process. Sometimes global information is not fitting locally.

To improve the flexibility, a strategy of calculating the statistical properties and/or the derivatives may be performed in dependency of the content of the output image. If, for example, the content of the output image shows a good level of quality, it may be decided for future input images not to calculate specific kinds of statistical properties or derivatives in order to save computational resources. The processing of the calculated statistical properties and/or derivatives (step f)) may be performed in dependency of the content of the output image for the same reasons. Thus, "feedback" can be given, which makes it for example possible to always reduce the calculation effort to a minimum while at the same time keeping a fixed quality of output image. Feedback can also be used to "adapt" a statistical engine, i.e. to use one statistical calculation or another according to a comparison with a feedback value.

The processing of the calculated statistical properties and/or the derivatives (step f)) may include the use of a variance look-up table or a sophisticated Kalman filter, for example.

The input image may be preprocessed before merging it with the histogram equalized image. Accordingly, the input image may be preprocessed before being equalized on the basis of the calculated histogram or before a histogram is derived from the preprocessed input image. In addition, the output image may be preprocessed before supplying it or a result of a quality control of the output image via a feedback path back to the process of calculating respective statistical properties and derivatives in order to influence the future strategy of calculating the statistical properties and/or the derivatives. The preprocessing may for example include filtering steps or data reduction steps.

According to the present invention, an apparatus for enhancing the quality of an image is provided which is adapted to carry out any step of the method described in the foregoing description.

The present invention finally provides a computer program product comprising computer program means adapted to perform all steps described in the foregoing description, when the computer program product is executed on a computer, a digital signal processor, or the like.

BRIEF DESCRIPTION OF THE SEVERAL VIEWS OF THE DRAWINGS

Further features and advantages of the present invention will become apparent from the following detailed description of preferred embodiments thereof taken in conjunction with the accompanying drawings, wherein:

FIG. 4 shows a schematic drawing illustrating how to obtain a derivative of a statistic property of an input image.

DETAILED DESCRIPTION OF THE INVENTION

Figure 1:
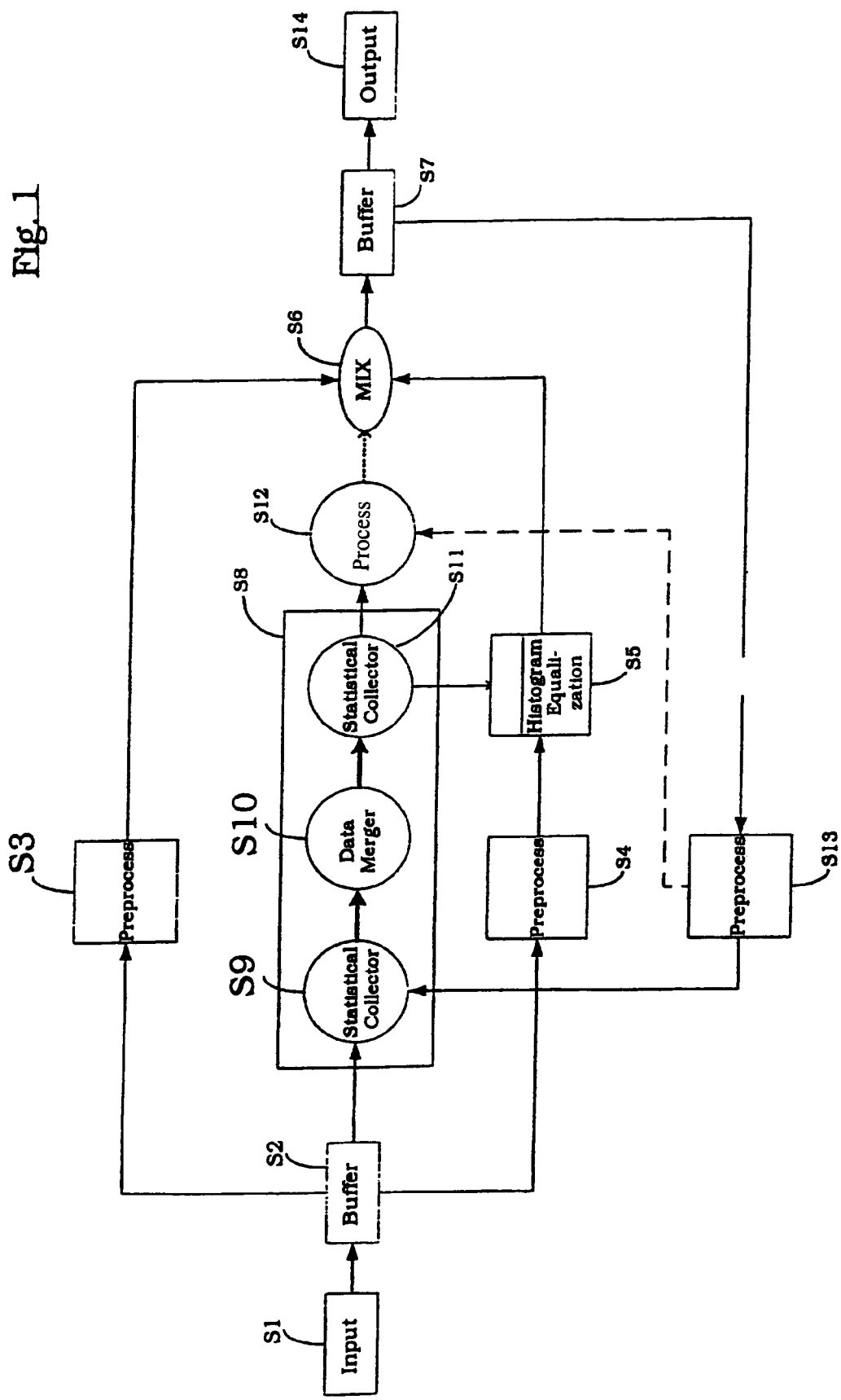
FIG. 1 shows a schematic drawing of a first preferred embodiment of the method according to the present invention.

In the following description, making reference to FIG. 1, a preferred embodiment of the method according to the present invention will be explained.

In a first step S1, input image data comprising an input image is read from an input image data stream into a buffer where the input image data is delayed in a second step S2. The input image of the delayed input image data is duplicated and the duplicated input image data sets are separately preprocessed in a third step S3 and in a fourth step S4, respectively, wherein the ways of processing the input image data sets may be different from each other.

After having preprocessed the input image in the fourth step S4, the preprocessed input image data is histogram equalized in a fifth step S5 to obtain a histogram equalized image. The histogram equalized image and the preprocessed input image of the third step S3 are mixed/merged/blended in a sixth step S6 to obtain an output image. The output image is stored in a buffer, where it is delayed in a seventh step S7.

Preferably at the same time when the input image is preprocessed in the third and the fourth step S3 and S4, the input image data read from the input image data stream is analyzed and processed in an eighth step S8. The eighth step S8 includes a ninth to eleventh step S9 to S11. In the ninth step S9 the input image and/or other images contained within the input image data are divided into at least two image parts, respectively, and statistical properties and/or derivatives thereof are calculated for each image part. Then, in the tenth step S10, image parts showing similar statistical properties or derivatives are merged to obtain respective image regions. Then, in an eleventh step S11, statistical properties and derivatives are recalculated for each merged image region, respectively.

The resulting calculated statistical properties and derivatives are processed in a twelfth step S12 in order to calculate a weight between the histogram equalized image and the preprocessed input image being used when mixing/merging/blending them together in the sixth step S6. The recalculated statistical properties and derivatives may also have an influence upon the step of equalizing the input image on the basis of the calculated histogram (fifth step S5). For example, it may be decided to calculate the histogram only on a part of the input image or to calculate the histogram on different parts of the input image in different ways, depending on the recalculated statistical properties and/or derivatives.

The content of the output image delayed in the seventh step S7 may be preprocessed in a thirteenth step S13, the result thereof being taken into account by the analyzing and processing process represented by the eighth step S8 and/or the twelfth step S12. This can be regarded as a kind of feedback path in order to verify the content of the output image with the content of the incoming input image data. This can be also useful in the case of dealing with transmission lines.

The preprocessing steps S3, S4, and S13 may for example include picture filtering, frequency filtering and image scaling.

Finally, the output image delayed in the seventh step S7 is outputted in a fourteenth step S14.

According to the present invention, it is possible by taking just one decision (in the twelfth step S12) to influence the output image so that it may be identical to the input image or completely different thereto in corresponding completely to the histogram equalized image. Of course, due to the mix/merge/blend in the sixth step S6 all intermediate results may also be possible.

In the following description, making reference to FIG. 2, a second preferred embodiment of the method according to the present invention will be explained.

Figure 2:
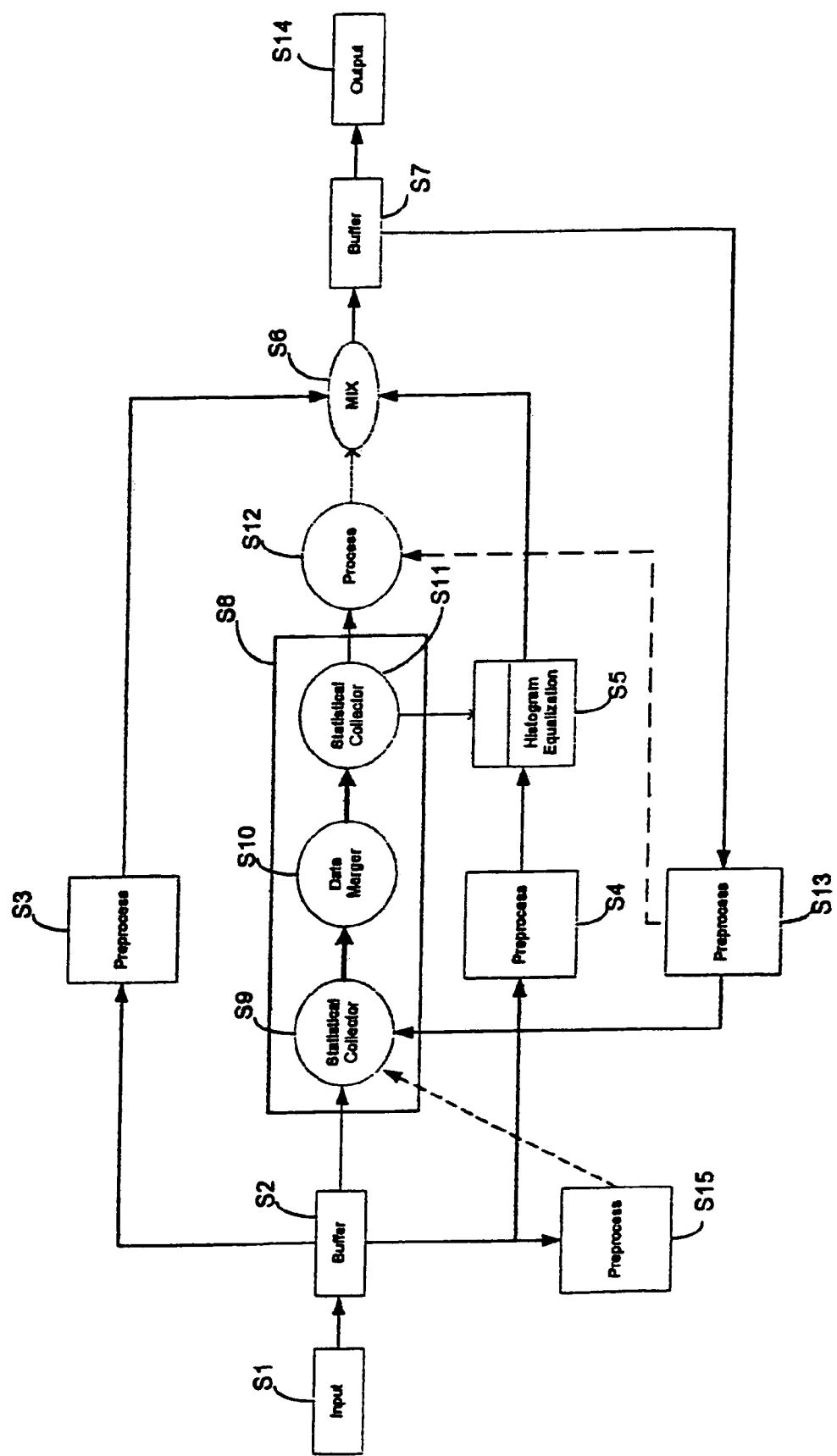
FIG. 2 shows a schematic drawing of a second preferred embodiment of the method according to the present invention.

The embodiment disclosed in FIG. 2 differs from that of FIG. 1 only by a further preprocessing step S15. In contrast to the embodiment of FIG. 1, where the picture segmentation being performed in the ninth step S9 always produces a set of image parts having the same amount of image parts and image part sizes/shapes, in this embodiment the segmentation process is more flexible. That is, in the fifteenth step S15 the sizes/shapes of the image parts are not fix, but determined in a flexible manner. For example, a low pass/high pass filter may be used to identify the areas of the input images having low frequency only and the areas with high frequency only. Then, a mapping of these areas may be performed. Another possibility would be to use a moving average filter, which would give the local average level of the input images and enable the system to derive areas of segmentation/image parts by using this information. The preprocessing of the fifteenth step S15 alternatively may be included into the ninth step S9.

Figure 3:
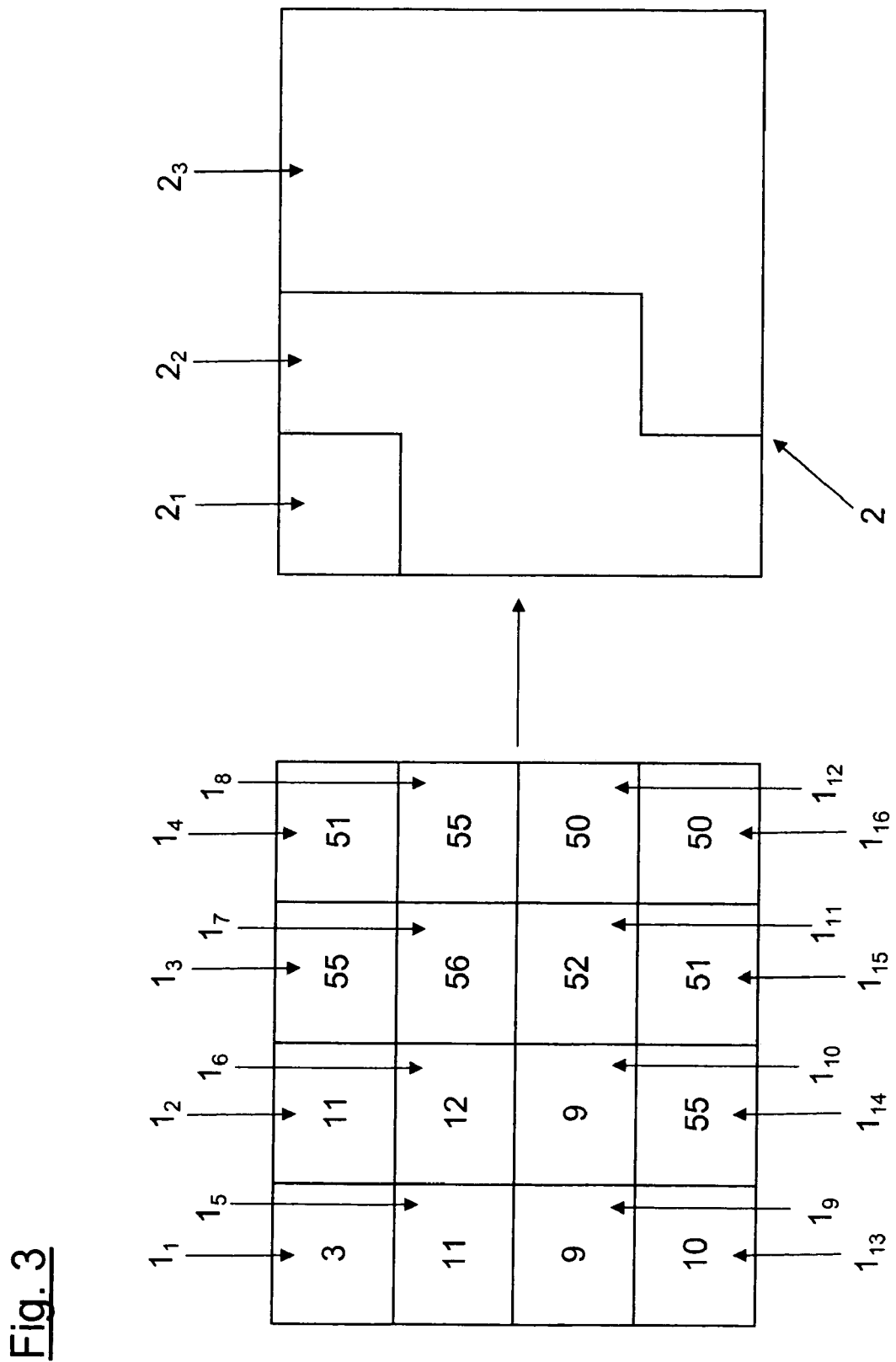
FIG. 3 shows an example of a merging process of different image parts to obtain respective merged image regions.

In the following description, making reference to FIG. 3, an example is given how the ninth to eleventh step S9 to S11 are performed in the embodiment represented by FIGS. 1 and 2.

An input image 1 is divided into a first to sixteenth image part 11 to 116. The values within each image part represent for example the intensity of the respective image part.

After having merged the image parts 11 to 116 having a similar intensity, a new image 2 is obtained showing first to third merged image regions 21 to 23. On each merged image region 21 to 23, respective statistical properties and derivatives are recalculated, which corresponds to the eleventh step S11 of FIG. 1/2.

In the following description, making reference to FIG. 4, an example is given about how to calculate a derivative on the basis of two input images.

A first input image 3 is divided into a first to fourth image part 31 to 34. A second input image 4 is divided into a corresponding first to fourth image part 41 to 44. Now, for example, the third image part 33 of the first input image 3 is compared with the third image part 43 of the second input image 4. From the difference of respective statistics calculated for the two image parts 33, 43, a gradient 5 as a derivative may be calculated. For example, an intensity gradient is calculated. The calculated statistics and/or derivatives may be of arbitrary dimension.

The use of two different input images in this example makes it clear that the invention considers temporal relations between different correlated input images, too.

What is claimed is:

1. A method of enhancing the contrast properties of an input image included in input image data, comprising:
analyzing the content of the input image or of another input image included in the image data and relating to the input image;
calculating respective statistical properties or derivatives of the content of the input image relating to the input image;
processing the calculated statistical properties or the derivatives;
duplicating the input image data for receiving first and second duplicated input image data;
calculating a histogram for the input image included in the first duplicated input image data;
equalizing the input image included in the first duplicated input image data on the basis of the calculated histogram to obtain a corresponding histogram equalized image; and
merging in dependency of a result of the processed calculated statistical properties or the derivatives the histogram equalized image and the input image included in the second duplicated input image data to obtain an output image; wherein the calculation of the statistical properties or the derivatives is performed in accordance with the content of the output image.

2. The method according to claim 1, wherein the input image or the other image are spatially separated into at least two image parts, respectively, before calculating the statistical properties or derivatives for each image part.

3. The method according to claim 2, wherein said image parts are determined by an image part detection unit.

4. The method according to claim 3, wherein if the calculated statistical properties or derivatives of different image parts are similar, merging the corresponding image parts together to obtain respective merged image regions, and again calculating statistical properties or derivatives thereof for each merged image region.

5. The method according to claim 1, wherein the input image data include another image and wherein the histogram calculation and equalization of the input image are performed in accordance with the content of the input image or of the other image relating to the input image.

6. The method according to claim 1, wherein the input image data include another image and wherein the histogram calculation and equalization of the input image are performed in accordance with the content of the input image and of the other image relating to the input image.

7. The method according to claim 1, wherein the processing of the calculated statistical properties or derivatives is performed in accordance with the content of the output image.

8. The method according to claim 1, further comprising:
preprocessing the input image comprised in the second duplicated input image data before merging it with the histogram equalized image.

9. The method according to claim 1, further comprising:
preprocessing the input image comprised in the first duplicated input image data before equalizing the input image on the basis of the calculated histogram.

10. The method according to claim 9, wherein the preprocessing of the input image includes a filtering process or a data reduction process.

11. A method of enhancing the contrast properties of an input image included in input image data, comprising:
analyzing the content of the input image and of another input image included in the image data and relating to the input image;
calculating respective statistical properties or derivatives of the content of the input image relating to the input image;
processing the calculated statistical properties or the derivatives;
duplicating the input image data for receiving first and second duplicated input image data;
calculating a histogram for the input image included in the first duplicated input image data;
equalizing the input image included in the first duplicated input image data on the basis of the calculated histogram to obtain a corresponding histogram equalized image; and
merging in dependency of a result of the processed calculated statistical properties or the derivatives the histogram equalized image and the input image included in the second duplicated input image data to obtain an output image; wherein the calculation of the statistical properties or the derivatives is performed in accordance with the content of the output image.

12. The method according to claim 11, wherein the input image and the other image are spatially separated into at least two image parts, respectively, before calculating the statistical properties or derivatives for each image part.

13. An apparatus for enhancing the contrast properties of an input image included in input image data, comprising:
- a duplication unit configured to duplicate the input image data for receiving first and second input image data;
- a calculation unit configured to calculate a histogram for the input image included in the first duplicated input image data;
- an equalizing unit configured to equalize the input image on the basis of the calculated histogram to obtain a corresponding histogram equalized image; and
- a processor configured to analyze the content of the input image or of another input image included in the image data and relating to the input image, to calculate respective statistical properties or derivatives of the content of the input image or of the other input image, to process the calculated statistical properties or the derivatives, and to merge, in dependency of a result of the processed calculated statistical properties or the derivatives the histogram equalized image and the input image included in the second duplicated image data to obtain an output image; wherein the calculation of the statistical properties or the derivatives is performed in accordance with the content of the output image.

14. An apparatus for enhancing the contrast properties of an input image included in input image data, comprising:
- a duplication unit configured to duplicate the input image data for receiving first and second input image data;
- a calculation unit configured to calculate a histogram for the input image included in the first duplicated input image data;
- an equalizing unit configured to equalize the input image on the basis of the calculated histogram to obtain a corresponding histogram equalized image; and
- a processor configured to analyze the content of the input image and of another input image included in the image data and relating to the input image, to calculate respective statistical properties or derivatives of the content of the input image or of the other input image, to process the calculated statistical properties or the derivatives, and to merge, in dependency of a result of the processed calculated statistical properties or the derivatives the histogram equalized image and the input image included in the second duplicated image data to obtain an output image; wherein the calculation of the statistical properties or the derivatives is performed in accordance with the content of the output image.

15. A computer-readable medium, storing computer program instructions for causing a computer to implement a method of enhancing the contrast properties of an input image included in input image data, comprising:
- analyzing the content of the input image or of another input image included in the image data and relating to the input image;
- calculating respective statistical properties or derivatives of the content of the input image data relating to the input image;
- processing the calculated statistical properties or the derivatives;
- duplicating input image data including an input image for receiving first and second duplicated image data;
- calculating a histogram for the input image included in the first duplicated input image data;
- equalizing the input image on the basis of the calculated histogram to obtain a corresponding histogram equalized image; and
- merging in dependency of a result of the processed calculated statistical properties or the derivatives the histogram equalized image and the input image included in the second duplicated input image data to obtain an output image; wherein the calculation of the statistical properties or the derivatives is performed in accordance with the content of the output image.

16. A computer-readable medium, storing computer program instructions for causing a computer to implement a method of enhancing the contrast properties of an input image included in input image data, comprising:
- analyzing the content of the input image and of another input image included in the image data and relating to the input image;
- calculating respective statistical properties or derivatives of the content of the input image data relating to the input image;
- processing the calculated statistical properties or the derivatives;
- duplicating input image data including an input image for receiving first and second duplicated image data;
- calculating a histogram for the input image included in the first duplicated input image data;
- equalizing the input image on the basis of the calculated histogram to obtain a corresponding histogram equalized image; and
- merging in dependency of a result of the processed calculated statistical properties or the derivatives the histogram equalized image and the input image included in the second duplicated input image data to obtain an output image; wherein the calculation of the statistical properties or the derivatives is performed in accordance with the content of the output image.

* * * * *